US012771032B2

(12) United States Patent
Tuovinen et al.

(10) Patent No.: US 12,771,032 B2
(45) Date of Patent: Oct. 20, 2026

(54) TX/RX ANTENNA STRUCTURE ENABLING ACCURATE TERRESTRIAL POSITIONING

(71) Applicant: KOHERENT OY, Vantaa (FI)

(72) Inventors: Tommi Tuovinen, Tyrnävä (FI); Markus Berg, Kiiminki (FI); Antti Hiltunen, Oulu (FI); Kari Leppänen, Helsinki (FI); Turo Heikkinen, Espoo (FI)

(73) Assignee: KOHERENT OY, Vantaa (FI)

( * ) Notice: Subject to any disclaimer, the term of this patent is extended or adjusted under 35 U.S.C. 154(b) by 266 days.

(21) Appl. No.: 18/708,801

(22) PCT Filed: Dec. 11, 2023

(86) PCT No.: PCT/FI2023/050676
§ 371 (c)(1),
(2) Date: May 9, 2024

(87) PCT Pub. No.: WO2024/134016
PCT Pub. Date: Jun. 27, 2024

(65) Prior Publication Data

US 2026/0163240 A1 Jun. 11, 2026

(30) Foreign Application Priority Data

Dec. 19, 2022 (FI) .................................... 20226120

(51) Int. Cl.
*H01Q 1/38* (2006.01)
*H01Q 9/04* (2006.01)
*H01Q 1/12* (2006.01)

(52) U.S. Cl.
CPC ......... *H01Q 9/0435* (2013.01); *H01Q 9/0471* (2013.01); *H01Q 1/125* (2013.01)

(58) Field of Classification Search
CPC H01Q 1/12; H01Q 1/125; H01Q 1/38; H01Q 1/48; H01Q 1/50; H01Q 9/04; H01Q 9/0435; H01Q 9/0471
See application file for complete search history.

(56) References Cited

U.S. PATENT DOCUMENTS 6,292,141 B1 * 9/2001 Lim ......................... H01Q 5/40 343/873
6,388,622 B1 * 5/2002 Jennetti ................ H01Q 21/065 343/872

(Continued)

FOREIGN PATENT DOCUMENTS

CN 109390671 A 2/2019
CN 217468805 U 9/2022

OTHER PUBLICATIONS

Berg et al. "Radiation Characteristics of Differentially-Fed Dual Circularly Polarized GNSS Antenna" 13th European Conference on Antennas and Propagation, Mar. 31, 2019, 5 pages.

(Continued)

*Primary Examiner* — Tho G Phan
(74) *Attorney, Agent, or Firm* — Ziegler IP Law Group, LLC.

(57) ABSTRACT

The present invention relates to an antenna design, which is usable in accurate position determinations. The antenna comprises a cylinder-shaped housing, a ground plane, and a single choke ring, where the choke ring and the housing are part of the same entity. A single round-shaped patch element is connected by four legs onto a circuit board, so that a rotationally symmetric structure is achieved. The height of the patch element is less than the height of the choke ring. Differential feeding network is placed on the bottom surface of the circuit board, where the ground plane forms the top surface of the circuit board. Two circular polarizations are (Continued)

enabled simultaneously. A self-calibration loop is also made possible.

16 Claims, 4 Drawing Sheets

(56) References Cited

U.S. PATENT DOCUMENTS

| | | | | |
|---|---|---|---|---|
| 6,836,247 | B2 * | 12/2004 | Soutiaguine | H01Q 9/0442 343/846 |
| 7,283,103 | B2 * | 10/2007 | Wangsvick | H01Q 19/106 343/846 |
| 8,842,045 | B2 * | 9/2014 | Tatarnikov | H01Q 21/30 343/846 |
| 9,024,831 | B2 * | 5/2015 | Wang | H01Q 1/241 343/893 |
| 10,197,679 | B2 * | 2/2019 | Astakhov | G01S 19/22 |
| 2003/0210193 | A1 | 11/2003 | Rossman et al. | |
| 2011/0134002 | A1 | 6/2011 | Suto et al. | |

OTHER PUBLICATIONS

European Patent Office, The International Search Report and Written Opinion of the International Searching Authority, Application No. PCT/FI2023/050676, mailed Mar. 11, 2024, 15 pages.

Finnish Patent and Registration Office, Search Report, Application No. 20226120, dated May 26, 2023, 2 pages.

* cited by examiner

TX/RX ANTENNA STRUCTURE ENABLING ACCURATE TERRESTRIAL POSITIONING

TECHNICAL FIELD

The present invention relates to accurate position determination where RF measurements and respective antennas are used. Especially, the present invention relates to the antenna structures, which fulfil the needed requirements concerning accurate positioning.

BACKGROUND

GNSS ("Global Navigation Satellite System") positioning systems have been used for quite some time in positioning applications around the world. GPS ("Global Positioning System") is a system initiated by the US government in the early 1970s and it is operated by the United States Space Force, but anyone with a GPS receiver is capable and allowed to use it for positioning purposes. Some other countries have also created respective satellite-based systems, such as GLONASS in Russia and BeiDou in China. These systems are all based in receiving signals transmitted from the satellites, by the appropriate receiver. The GPS for instance requires that at least four satellites must be in Line-Of-Sight visibility with the GPS receiver in order to work properly.

GPS signals apply frequency ranges in five sub-bands, where sub-bands L1 (1,57542 GHz) and L2 (1,2276 GHz) are the two regular transmission frequencies used by the GPS satellites. In turn, GLONASS signals apply frequency ranges around 1,601-1,602 GHz, 1,246-1,248 GHz and 1,202 GHz, approximately.

Usually, the best available accuracy of the GNSS systems, when used in carrier phase mode (e.g. RTK GPS; i.e. Real Time Kinematic GPS), remains at around 1-3 centimeters when the view to the sky is unobstructed and a reference station is nearby (less than 10 kilometers). Such centimeter-level accuracy is necessary for example in automation of logistics and construction projects. Unfortunately, the accuracy of carrier-phase GNSS positioning typically drops to several tens of centimeters because of nearby buildings or reflecting surfaces. In addition, satellite positioning systems do not work indoors. There is thus a need for centimeter-level radio positioning that operates reliably in all circumstances, also indoors.

Terrestrial radio positioning that utilises carrier-phase measurement and makes two-way measurements, i.e. using a transceiver instead of a receiver in the tracked object, can yield even millimeter-level distance or position measurement accuracy (PCT/FI2022/050017). For accurate distance measurement, only a single link between two radio nodes, both capable of transmitting and receiving, is required. This is suitable for terrestrial applications where large number of simultaneous radio links between nodes is impractical, unlike in GNSS systems where even tens of satellites can and need to be used simultaneously.

In high-accuracy radio position measurement it is essential that the antenna to be used is of sufficiently high quality. The phase center of the antenna should remain stable within one or two millimeters for the angles of arrival or departure used in the measurement. For satellite positioning antennas, this range of angles is from −90 to +90 degrees as measured from the boresight direction. This large range together with the requirement for high phase center stability makes the antenna very expensive to manufacture. For terrestrial applications, range of −60 to +60 degrees is sufficient. Other important requirement is that the antenna unit is capable for both transmission and reception. The active antenna units used for GNSS are only capable for reception. Also, the antenna must be capable of receiving/transmitting both left-hand and right-hand circular polarizations. A further requirement is that there is a need to minimize the radiation directed to a backwards direction of the antenna.

In addition, the antenna unit should allow calibration of the phase length of the antenna cabling. Such a calibration is not needed in GNSS antenna units and therefore they do not support such a feature.

There is a clear need for an inexpensive antenna design that fulfils the requirements for accurate carrier-phase-based terrestrial radio positioning.

Currently available products and concepts are discussed next.

Choke ring antennas form one group of antennas which have been previously used in GPS and radar applications. The choke ring antenna is a directive antenna used at VHF & UHF frequencies, which antenna consists a number of concentric conductive cylinders around a central antenna. As the choke ring antenna is able to reject multipath signals originated from a source, it allows to make quite accurate results e.g. in distance determination measurements. A choke ring antenna can provide a millimeter-range accuracy in precision of locationing used in surveying and geological measurements. A drawback of the choke ring antenna is that it has quite a complicated physical structure, which makes its manufacturing costs unnecessarily high.

Among choke ring antennas, Trimble Inc. has an antenna product named as "Trimble GNSS Ti-V2 Choke Ring Geodetic Antenna" (see https://realtimenetworks.trimble.com/Trimble-Choke-Ring-Antenna.aspx). It is meant for GNSS purposes. This antenna has four concentric rings (i.e. cylinders) around the central antenna structure. The manufacturer claims that this antenna ensures phase-center eccentricity of 2 mm or better, and phase-center repeatability of less than 1 mm.

Harxon has a product called as "Harxon HX-CGX601A 3D GNSS Choke Ring Antenna". It is also meant for GNSS purposes. Its structure is a bit like a 3-dimensional cone (as shown in http://www.terrisgps.com/product/harxon-hx-cgx601a/) with five concentric cylinders. It is said to have outstanding low elevation satellite tracking and sub-millimetre phase center stability. The application areas involve reference stations, geodetic base stations, monitoring, seismic studies, and atmospheric studies. It is said to have better performance in low elevation tracking performance compared to 2D choke ring antenna designs.

U.S. Pat. No. 6,040,805 ("Huynh") discloses a low-profile ceramic choke for GPS antenna systems, invented in the late 1990s. The basic structure resembles the above Harxon's product a lot. Mass production by molding is promoted by using a ceramic material within the rings.

U.S. Pat. No. 9,407,006 B1 ("Wilson") discloses a choke for antenna. There is a radiator having a resonant frequency and a ground plane, a cylindrical choke with a height of ¼ of the wavelength of the resonant frequency. The feed signal carrier passes through the choke, with respective conductors connected to the radiator and to the ground plane. The ground plane connects to the lower (i.e. proximal) end of the choke and to the radiator as well. See especially FIG. 2 of Wilson.

WO 2009/067805 A1 ("Johnston") discloses a dual circularly polarized antenna. See especially FIG. 8 of Johnston. This antenna structure includes conducting disks, which are spaced from the antenna (i.e. the uppermost element), and also from one another. The conducting disks are supported by a conducting central rod or tube for mechanical stability and also, the tube provides an interior pathway for signal and power feeds of the antenna. This structure suppresses well the response to signals coming from below the antenna. Some arrangements of the disks tend to cause varying vertical position phase centers as the reception elevation angle is changed. This is a drawback of this structure. Johnston's solution in FIG. 8 is also a rather complex antenna structure, and this increases the manufacturing costs and time.

Novatel has a product called "GNSS-750 Wideband Choke Ring Antenna". It resembles the above Harxon's choke ring antenna design a bit, but additionally, Novatel's cylindrical rings are designed with gaps, where the gaps are distributed evenly across the whole ring, concerning all rings. Novatel also applies a so-called Dorne-Margolin antenna element, which is mentioned to be ultra-wideband. The presented antenna is suitable for GNSS and geological monitoring. It is mentioned to have a stable phase center. The antenna has an aluminium alloy construction. The presented design is mentioned to improve low elevation tracking especially.

Topcon has a "PN-A5 antenna", where the main components of the antenna element are a radome, a cup with dipoles and power summarizing unit. The power summarizing unit is capacitively coupled with the dipoles. See FIG. 6 in page 9 of https://insidegnss.com/wp-content/uploads/2011/10/Topcon_PN-A5_antenna_white_paper. pdf.

Thus, there are still some major problems in the prior art solutions, Namely, high manufacturing costs per antenna unit due to complexity of the structure is one known problem. Furthermore, prior art solutions concentrate on reception antennas only (as applied in GNSS positioning applications), as in the present invention there is a need to have an active antenna with both the TX and RX functionalities. There are also strict requirements for mm-accurate terrestrial positioning for a TX&RX antenna, which are not fulfilled yet with current antenna solutions.

Many antennas also involve only a single circular polarization to be received when polarization of a signal is concerned. There is a clear need to obtain an antenna which additionally supports both a left circular polarization (LCP) and a right circular polarization (RCP).

Concerning prior art, it can also be summarized that almost every circularly polarized antenna (with or without the choke rings) that has been developed for GNSS reception purposes must operate between +90 . . . −90 degrees from the boresight (i.e. the vertical central axis of the antenna pointing directly upwards). This requirement comes from the fact that on average half of the visible satellites are below 30 degrees elevation (half of the sky area is below 30 degrees elevation). In terrestrial positioning applications, however, angular range of +60 . . . −60 degrees from the boresight is sufficient. This allows a new low-cost design to be used, not appropriate for the design of the prior art.

The present invention proceeds into solving these technical problems.

SUMMARY

The present invention introduces a structure for an antenna which is suitable for accurate carrier-phase-based terrestrial radio positioning. Specifically, the problems brought out in the background are here solved by the described antenna and the described antenna structure.

The present invention introduces an antenna, which is characterized in that the antenna comprises:

- a cylinder-shaped housing;
- a ground plane within an upper half of the cylinder-shaped housing;
- a single choke ring locating coaxially on the cylinder-shaped housing on top of the ground plane, where the choke ring and the housing are integrally part of the same piece of material, where the diameter of the choke ring is less than the diameter of the cylinder-shaped housing;
- a single round-shaped patch element, which patch element is connected by four legs onto a feeding network through the ground plane, the patch element locating coaxially with the choke ring, within a cylindrical volume determined by the choke ring, obtaining an essentially rotationally symmetric structure;
  - wherein a level difference of the patch element in relation to the ground plane is less than the height of the choke ring.

In an embodiment of the antenna, the four legs support the edges or near edges of the patch element with even mutual distances between one another. The four legs 15 that support the edges or near edges of the patch element 14 with even mutual distances between one another may be made of the same piece of material as the patch element.

In an embodiment of the antenna, the ground plane forms a top surface of a circuit board locating on top of the housing, and a bottom surface of the circuit board comprises the feeding network of differential input signals, fed via each of the four legs onto the patch element, wherein the feeding network locates in an area determined to be inside the choke ring but on an opposite surface of the circuit board.

In an embodiment of the antenna, the bottom surface of the circuit board comprises electrical components outside of the area defined by the choke ring, but on the opposite surface of the circuit board in order not to interfere with the feeding network confined within the choke ring.

In an embodiment of the antenna, the housing comprises a plastic piece, which is placed below the circuit board, which plastic piece is pressable by force against the circuit board, with conductive gasket material placed between the top surface of the circuit board and the lower edge of the choke ring, enabling a galvanic contact between the ground plane and the choke ring.

In an embodiment of the antenna, the patch element is manufactured from brass.

In an embodiment of the antenna, the antenna is applicable in the frequency range of 5,2-5,9 GHZ.

In an embodiment of the antenna, the distance between the outer cylindrical edge of the housing and the choke ring is approximately half of the used wavelength. The choke ring may be a single choke ring.

In an embodiment of the antenna, the differential feeding network is configured to create two circular polarizations using the antenna, comprising a left circular polarization (LCP) and a right circular polarization (RCP).

In an embodiment of the antenna, the patch element with its legs may be bent from a single piece of material. This enables to reduce the manufacturing costs of the antenna.

In an embodiment of the antenna, the antenna is configured to be applied in position determination measurements, performing RX measurements for signals incoming between −60 . . . 60 degrees in relation to the vertical direction right above the antenna.

In an embodiment of the antenna, the bottom surface of the circuit board comprises a polarization switch, a TX/RX switch, a TX signal branch comprising a power amplifier and a band-pass filter, an RX signal branch comprising a band-pass filter and a low noise amplifier.

In an embodiment of the antenna, a self-calibration circuit is configured to be measured in order to obtain lengths of antenna cablings in both TX and RX signal branches, the self-calibration circuit comprising the antenna cablings, and circuit elements, wherein the self-calibration circuit uses leakage in the TX/RX switch.

In an embodiment of the antenna, the distance between the patch element (14) and the ground plane is selected to be in a range of 0,1 . . . 0,15 times the wavelength.

In an embodiment of the antenna, the distance between an outer edge of the patch element and the choke ring is selected from range of 0,14 . . . 0,18 times the wavelength, thus creating a substantially flat phase pattern and minimizing amplitudes of back lobes.

In an embodiment of the antenna, the distance between an inner surface of the choke ring and the closest leg is selected to be in a range of 0,1 . . . 0,15 times the wavelength. The choke ring may be a single choke ring.

In an embodiment of the antenna, width of the legs is selected from a range of 1,0 . . . 3,0 mm.

In an embodiment of the antenna, the cylindrical volume determined by the choke ring is covered from the top by a cover manufactured from high-density polyethylene, where the cover is almost RF transparent.

BRIEF DESCRIPTION OF THE DRAWINGS

FIG. 1*a* illustrates a top-angled view on the inner structure of an antenna, with the main functional parts visible, in an embodiment of the present invention, FIG. 1*b* illustrates a top-angled view of the antenna structure provided with an RF transparent cover, according to an embodiment of the present invention, FIG. 1*c* illustrates a cross-sectional side view of the antenna arrangement, in an embodiment of the invention, FIG. 1*d* illustrates a direct view to a bottom side of the antenna arrangement where the back cover is taken out of the view for visualization purposes, FIG. 1*e* illustrates another direct view to a bottom side of a circuit board, where a pressing element, i.e. the plastic piece, is taken out of the view for visualization purposes.

DETAILED DESCRIPTION

The present invention describes a phase-stable antenna designed for use in accurate terrestrial radio positioning applications. Even though the invented structure is inexpensive and relatively simple to manufacture, its phase stability is notably good so that the phase center moves only at most 1-2 mm, when different transmission/reception angles are considered. Thus, such structure provides an excellent performance. In applications concerning terrestrial positioning, we are interested in angles of −60 degrees . . . +60 degrees from the boresight.

The antenna according to the present invention is designed like shown in the following embodiments.

Figure 1A:
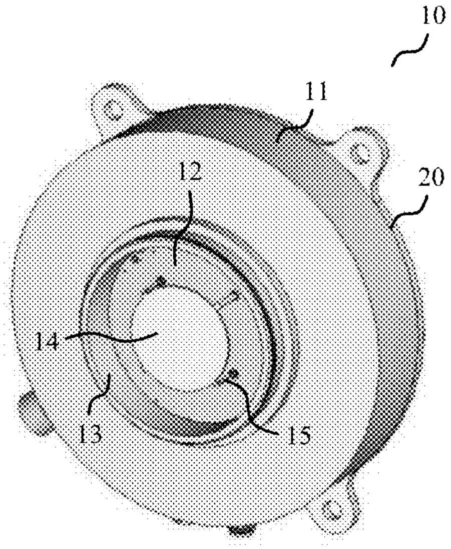
FIGS. 1*a*-*e* illustrate a mechanical model of the antenna according to an embodiment of the present invention, and some interior views and a cross-sectional side view of the antenna arrangement according to an embodiment, where.

FIG. 1*a* illustrates a first one of these embodiments. It illustrates a structure of the antenna 10 according to the present invention, shown from an upper angled viewpoint. The antenna 10 comprises a cylinder-shaped housing 11 (together with a back cover 20), a single choke ring 13 and a patch element 14. In this embodiment shown in FIG. 1*a*, the cylinder-shaped housing 11 and the single choke ring 13 are integrally part of the same physical piece of material, and thus, made of the same material. There is also a printed circuit board 17 with a ground plane 12, which is set to locate within an upper half of the cylinder-shaped housing 11. The choke ring 13 locates coaxially with the cylinder-shaped side wall of the housing 11, on top of the ground plane 12 as well. Defined in yet another way, the diameter of the choke ring 13 is less than the diameter of the cylinder-shaped housing 11. In an embodiment, the diameter of the choke ring 13 is approximately one wavelength smaller than the diameter of the cylinder-shaped housing 11.

In an embodiment, the housing 11 and the choke ring 13 are manufactured of aluminium, forming a single material piece. The fact that in this embodiment, the housing 11 integrally comprises the choke ring 13 as part of the same material piece, and that the used material here is aluminium, makes the resulting antenna product inexpensive to manufacture.

In a preferred embodiment of the invention, a single choke ring 13 is only needed for creating the desired antenna design. The advantages discussed later can be obtained with just a single choke ring 13.

In the middle and in the upper part of the structure, there is a single round-shaped patch element 14, where the plane of the patch element 14 is aligned in a horizontal direction (if the cylindrical housing is set to rest horizontally like shown in FIG. 1*a*). Furthermore, the patch element 14 is placed so that it locates coaxially with the choke ring 13, within the volume determined by the choke ring 13. The patch element 14 locates on four legs 15 so that all the legs 15 connect through vias to the feeding network which locates on a lower surface of the circuit board 17 (when the patch element 13 points upwards; as in FIG. 1*c*) i.e. on the opposite side compared to the ground plane 12. In an embodiment, the connection method between a leg 15 and the feeding network is soldering. In addition, the length of each of the legs 15 is a bit longer compared to the height of the patch element 14 in reference to the level of the ground plane 12. In other words, the length of the leg 15 is practically the same as the patch element 14 height plus the thickness of the circuit board 17, in the described embodiment. Furthermore, the height of the patch element 14 is clearly less than the height of the choke ring 13 in various embodiments of the present invention.

In an embodiment, the patch element 14 is implemented as a metal sheet component. In a further embodiment, the patch element 14 is made of brass.

Concerning the outer housing 11, which is cylinder-shaped, the choke ring 13, the patch element 14 together with its four vertically installed legs 15 placed in equidistant mutual holes or vias through the circuit board 17 (as in the view according to FIG. 1*c*), and the feeding network of four differential feeding lines, an electrically rotationally symmetric structure is obtained.

The functional purpose of the choke ring 13 is to make desired effects to the characteristics of the radiating properties of the antenna structure 10. In practice, the choke ring 13 prevents the spreading of the radiating field into the sides of the antenna structure 10. The use of the single choke ring 13 also improves the phase performance of the antenna structure 10. Furthermore, the diameter of the housing 11 may be selected to be approximately one wavelength more than the outer diameter of the choke ring 13, so that the outer top surface of the housing 11 (i.e. the top planar surface area of the housing 11 locating between the choke ring 13 and the outer round-shaped edge of the housing 11) forms an electrical discontinuity location on a horizontal plane (when the view conforms with FIG. 1*c*). Such a discontinuity location together with the choke ring 13 and the patch element 14 prevents the radiation to emit backwards (i.e. downwards when looking at FIG. 1*c*). This is very beneficial in the terrestrial positioning applications.

Figure 1B:
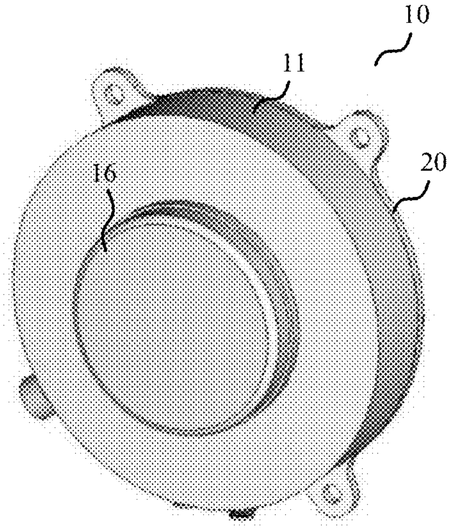

In an embodiment of the present invention, the antenna arrangement comprises a cover 16 shown in FIG. 1*b*. This cover 16 may be manufactured from hard but light material which is transparent or close to transparent in view of the radio signals.

In an embodiment of the present invention, the cover 16 (i.e. the radome) is manufactured from high-density polyethylene (i.e. HDPE). Its advantage is that it endures outdoor environments and its different characteristics, such as different weather conditions, and varying temperatures. High-density polyethylene is also easy to process and handle (when manufacturing/assembling the device, and when installing/changing e.g. position of the whole antenna structure).

Furthermore, the permittivity of high-density polyethylene is appr. 2.3, which is one of the smallest among RF applicable plastic materials. Furthermore, the use of high-density polyethylene also results in very small losses to penetrating RF signals. In an embodiment, this radome made of high-density polyethylene may be made rather thin, but still, it provides sufficient mechanical endurance against outside forces and thermal effects.

In an embodiment, the cover 16 may be installed right around the outer edge of the choke ring 13. Thus, the lower (or in sense, inner) round-shaped surface of the cover 16 will be set on the same height with the upper edge of the choke ring 13.

In another embodiment, the cover 16 may be placed so that its largest round-shaped inner surface locates a certain distance upwards from the upper edge of the choke ring 13. It is also possible that the cover 16 has some other shape than a flat cylindrical shape; the cover 16 may also be in a form of a half-sphere, for instance.

Figure 1C:
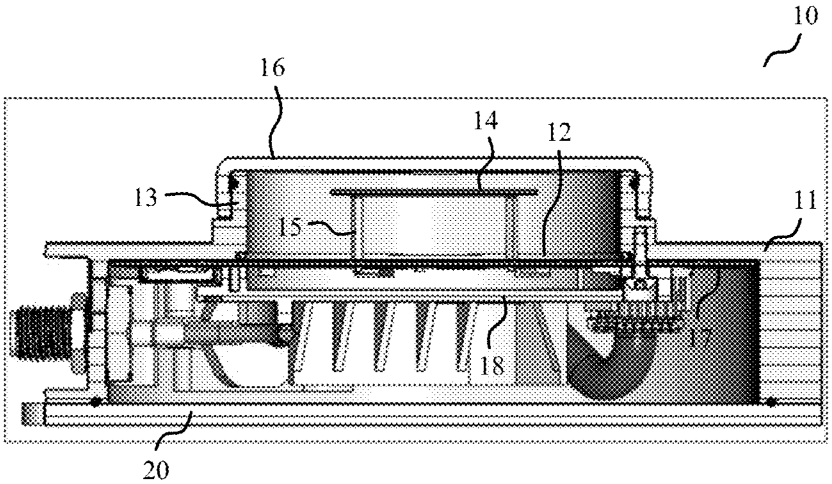

FIG. 1*c* illustrates a cross-sectional side view of the antenna arrangement, in an embodiment of the invention. This view shows in practice all relevant mechanical elements which are part of this embodiment of the antenna 10 according to the present invention. The topmost U-shaped element is the cover 16. The choke ring 13 is installed on the top surface of the housing 11 in a central position so that the cylindrical central axis of the choke ring 13 is in practice essentially the same as the central axis of the cylindrical housing 11 (as indicated also by the embodiments as shown in FIGS. 1*a* and 1*b*).

The patch element 14 is also installed in a central position on top of the circuit board along four legs 15. The circuit board has electrically conductive wirings, including the patch feeding network, along its bottom surface, while the top surface of the circuit board represents a ground plane 12. The legs 15 are installed through the ground plane, where the ground plane 12 represents ground for electrical wirings locating on the bottom surface of this circuit board 17. In this embodiment, the circuit board extends to a wider diameter than just the diameter of the choke ring 13, essentially to the inner surface of the whole housing 11, as it may be seen in FIG. 1*c*. In this way, the circuit board may take the whole inner diameter of the housing 11 into use, and it is thus possible to accommodate various wirings and electrical components more easily on the lower surface of the circuit board 17 (without interfering with the feeding network), when the surface area of the circuit board 17 has thus been maximized.

In an embodiment of the present invention, the patch element 14 and the legs 15 are part of the same, integrally made single element. In this way, as the element comprising the patch element 14 and the legs 15 may be manufactured as a single component, it also simplifies its manufacturing process, which makes it more cost-efficient altogether.

The electrical input feeding signal proceeds to the surface of the patch element 14 directly via the electrically conductive legs 15 (e.g. made of metal). Thus, there are four feeding lines proceeding via the legs 15, and partly along the bottom surface of the circuit board, via the wiring there. Thus, the feeding signals and respective wirings also go through the circuit board 17 itself.

In an embodiment of the present invention, the four electrical supply lines implement a differential voltage feeding system (i.e. a feeding network) towards the antenna (where the main radiating element of the antenna 10 is the patch element 14). We discuss this differential voltage feeding system/network later in more detail and refer also to FIG. 1*e* in that sense.

The structure shown in FIG. 1*c* additionally comprises a plastic piece 18 which is shown as a wide U-shaped element with five tilted supporting sections in its lower part. This plastic piece has attachment means in its left and right hand side ends. In practice, this means that the plastic piece, which is basically a horizontally shaped element, may be screwed onto and through the bottom surface of the circuit board 17 so that the screws attach into the metal-made choke ring 13 from below. These screw locations are visible in FIG. 1*c*. The purpose of the plastic piece 18 and the screwing procedure is that the ground plane 12 which is present in the top surface of the circuit board 17, is mechanically pressed to the bottom edge of the choke ring 13. In an embodiment, this connection may be made galvanic with a specific intermediate material, for example a conductive gasket. In an embodiment, the conductive gasket material is Nolato 8817.

The lower section of the choke ring 13 may be formed as a bit thickened (as shown in FIG. 1*c*) part, in order to accommodate the incoming screw better in this structure.

In an embodiment of the present invention, there are five screws connecting the plastic piece 18 against the choke ring 13 with the circuit board 17 in between. This number of screws can also be seen in the following FIGS. 1*d* and 1*e*. However, some other number of connecting means, such as 4 or 6 or 8 of them, is also a possible solution, in other embodiments of the present invention.

The circuit board 17 and its design features concerning placements of electrical elements and differential input feeding lines (i.e. the feeding network), are discussed in connection with the following FIGS. 1*d* and 1*e*, in respective embodiments of the invention.

Figure 1D:
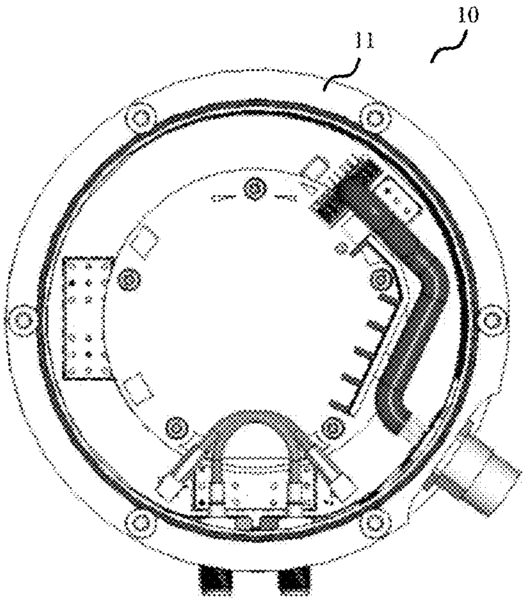

FIG. 1*d* illustrates a direct view to a bottom side of the antenna arrangement 10 where a back cover 20 is taken out of the view for visualization purposes. The back cover 20 may be attached to the cylindrical housing 11 with screws, thus completing the housing 11 from the bottom side. The main part of the cylindrical housing 11 (which is shown in FIGS. 1*a* and 1*b*) and the choke ring 13 are integrally part of the same physical piece in this embodiment, as described also elsewhere.

This view shows that many of the required electrical components are installed on the bottom surface of the circuit board 17. Additionally, the required electrical components or at least a majority of the space-consuming electrical components are placed so that they locate on top of an outer band-shaped surface area of the circuit board 17. This means that the inner and centrally locating round-shaped sub-surface area of the circuit board 17 (i.e. an inner surface area of the circuit board 17), which has the same radius and respective location as the cylindrical choke ring 13 in the opposite side of the board, may be reserved for the differential feeding network wirings, and the outer surface area of the circuit board 17 may be reserved for attaching electrical components onto it, in an embodiment of the present invention. The outer surface area is shown especially in FIG. 1*d*, and the inner surface area is shown especially in FIG. 1*e* described a bit later.

The electrical components may also comprise certain required wirings concerning the antenna's intrinsic structure, such as the incoming feed lines before the actual differential input voltages are created. These wirings may also comprise flexible cablings or flat cablings between certain components or parts on the circuit board 17 or connectors on the housing 11. The wirings may comprise a bundle of thin wires, which comprise lines of control electronics for the antenna or co-axial cables for the radio signals. The main reason for the placements of the larger electrical components and larger separate cablings and their connectors onto the outer surface area of the circuit board 17 is that they do not interfere with the electronic properties of the feeding network there.

Figure 1E:
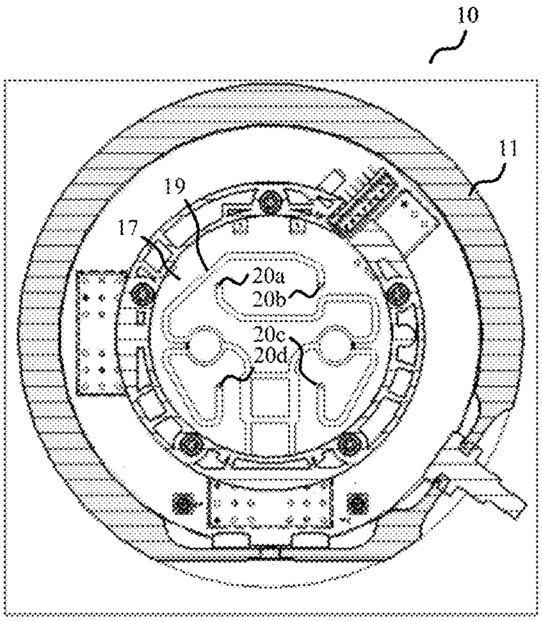

As a space-efficient example concerning the wirings and their placements, we refer to FIG. 1*e*, which illustrates another direct view to a bottom side of a circuit board 17, where a pressing element i.e. the plastic piece 18 is taken out of the view for visualization purposes.

In the shown embodiment, the differential feeding lines network 19 (i.e. the network comprising differential feeding lines, and in this example, four of them) locates right within the inner surface area of the circuit board 17 (i.e. inside the round edge of the choke ring 13, but on the other side of the circuit board 17 compared to the choke ring 13). The four differential feeding lines 19 are wired so that they end directly under an installation position of the respective leg 15. In that sense, the end locations (i.e. the four end spots) of the differential input wirings on the bottom side of the circuit board 17 form corners of a square, as the legs 15 are equidistantly placed and also in symmetrical positions on the other side of the circuit board 17 (with respect to the central axis). The installation positions of the legs 15 i.e. the end spots of the differential feeding lines 19 on the side of the circuit board 17 are marked as spots 20*a*-20*d* in FIG. 1*e*.

Concerning a major application area of the presented antenna arrangement 10, the accurate terrestrial positioning, the antenna 10 is applicable in the licence-free frequency range of 5,2-5,9 GHZ. However, other frequency areas and ranges are not excluded in the use situations of this antenna according to the present invention. In other words, 5,2-5,9 GHz represents a highly usable frequency range in an embodiment of the antenna according to the invention, but not the only one. It is notable that GNSS systems do not work in the RF frequency range of 5,2-5,9 GHZ.

Notably, the frequency range of 5,2 to 5,9 GHz is part of the broader U-NII (Unlicensed National Information Infrastructure) band in many countries, and commonly used for various wireless communication applications such as Wi-Fi, wireless LANs, point-to-point and point-to-multipoint communication, and other wireless technologies. Beneficially, the frequency range of 5,2 to 5,9 GHz is less crowded, provides more bandwidth and has shorter wavelength than the 2.4 GHZ band, which are all important characteristics for accurate position measurement. The applied frequency range defines certain dimensions within the antenna structure itself, in an embodiment of the present invention. We may define them in the form of "coefficient times the wavelength", i.e. "N*λ", where N is a positive rational number. At 5,2 GHz, the respective wavelength is approximately 5,77 cm. At 5,9 GHZ, the respective wavelength is appr. 5,08 cm. In the middle of the band, the wavelength is 5,43 cm.

In an embodiment, the distance between the outer cylindrical edge of the housing 11 and the choke ring 13 is approximately half of the used wavelength in the middle of the band. In absolute values with the above frequency range, this corresponds to approximately 2,7 cm in that embodiment. This structural feature makes it possible to minimize the radiation directed to a backwards direction which is an advantageous characteristic of the presented antenna structure.

Furthermore, in an embodiment, the distance between the patch element 14 and the ground plane 12 (i.e. the height of the patch element 14) is selected to be in a range of 0,1 . . . 0,15 times the wavelength. This is approximately one eighth (i.e. ⅛=0,125) of the used wavelength. In absolute values in the middle of the desired frequency band, this corresponds to approximately 6,8 mm.

Furthermore, in an embodiment, the distance between an outer edge of the patch element 14 and the choke ring 13 is selected from range of 0,14 . . . 0,18 times the wavelength, thus creating a substantially flat phase pattern and minimizing amplitudes of back lobes. In absolute values, this is approximately 8,4-8,7 mm in that embodiment.

Furthermore, in an embodiment, width of the legs 15 (i.e. patch pins 15) is selected from a range of 1,0 . . . 3,0 mm. In a specific embodiment, the width of the legs 15 is selected to be 2,25 mm. An advantage of using a relatively large width of the leg or the patch pin 15 is that it improves the mass production capability of the antenna 10 by making the structure more robust mechanically.

The above listed ranges in the respective distances and widths have the advantage, that the antenna performance is very good concerning terrestrial positioning applications which require angular ranges of −60 . . . +60 degrees from the boresight.

The presented antenna structure 10 allows creating two mutually orthogonal circular polarizations, left circular polarization ("LCP") and right circular polarization ("RCP") with almost similar radiation patterns. This arrangement of circular polarizations has an advantage in which the reflections are well suppressed. This is especially true when the polarization discrimination (i.e. the ratio of the received power of the two waves representing different polarizations) is at least 20 dB. The presented antenna structure 10 according to the present invention allows this. The reason for the reflection suppression is the fact that a reflection tends to invert the circular polarity of the signal.

In an embodiment, there are two feeding points in the feeding network; i.e. two feeds, one for each polarization. The used polarization may be selected by an RF switch.

It is also noted that traditional GNSS antennas in the prior art are only receiving signals and they are applying only a single circular polarization. With the presented structure according to the invention, the antenna is capable to both transmit and receive, and furthermore, apply both LCP and RCP polarizations. This is additionally advantageous in the terrestrial positioning context, as the selected antenna may work as either transmitter or receiver (i.e. providing more flexibility in the link selection). Two polarizations allow a more accurate estimation and compensation of the reflection. It also allows the mutual roll angle between two circularly polarized antennas to be measured.

In the present invention, the antenna is designed so that the radiation will propagate to different angular directions with the same mutual phase in practice. In other words, the equi-phase surface is very near to a sphere centered at the phase center of the antenna 10. This is desired to be true also for the whole used frequency band(s), and with the present antenna structure according to the invention, this is indeed achieved. This is a specific advantage of the present invention.

Furthermore, the electronic components, elements and circuitry locate in a single circuit board, in the described embodiments. This decreases the manufacturing costs when comparing to multi-circuit-board solutions and makes the manufacturing process of the antenna itself simpler and quicker.

In an embodiment, the antenna structure is provided with a heating functionality. This feature may be implemented with at least one heating element based on electric resistivity, as such an element transforms electric energy into thermal energy. Any electric heater element is however feasible. There may also be several different heating elements across the antenna structure. One reasonable way of implementing the thermal management of the antenna structure is to place several heating elements across different parts of the housing 11 or the circuit board 17. In this way, the antenna structure 10 located outside e.g. in winter conditions may be kept above 0° C. so that ice and snow will not stay on the cover 16 or on the housing 11 (they instead melt and evaporate from the outside surface of the antenna structure). The harmful effects of ice on the radio path will thus be mitigated. Also, the temperature of the circuit board may be controlled in varying ambient temperatures, so that strains emerging from thermal gradients are minimized. In this way, the physical changes due to thermal expansions/deductions are less likely to take place in the electric circuitry.

Generally speaking, it is advantageous to have antennas separated even several meters from the radio units, as it allows easier placement of the antennas. Furthermore, this arrangement allows only a single radio unit to be connected to several antennas, which results in direct cost savings. Separation of the antenna from the radio unit requires cabling and typically an active antenna arrangement that is capable of compensating the cable losses and additional thermal noise from the cabling, and also capable for both transmission and reception. The length of the cabling needs to be measured in order to obtain an accurate distance or position measurements. This brings the need for a calibration solution which allows such a measurement. The present invention presents such a solution.

Figure 2:
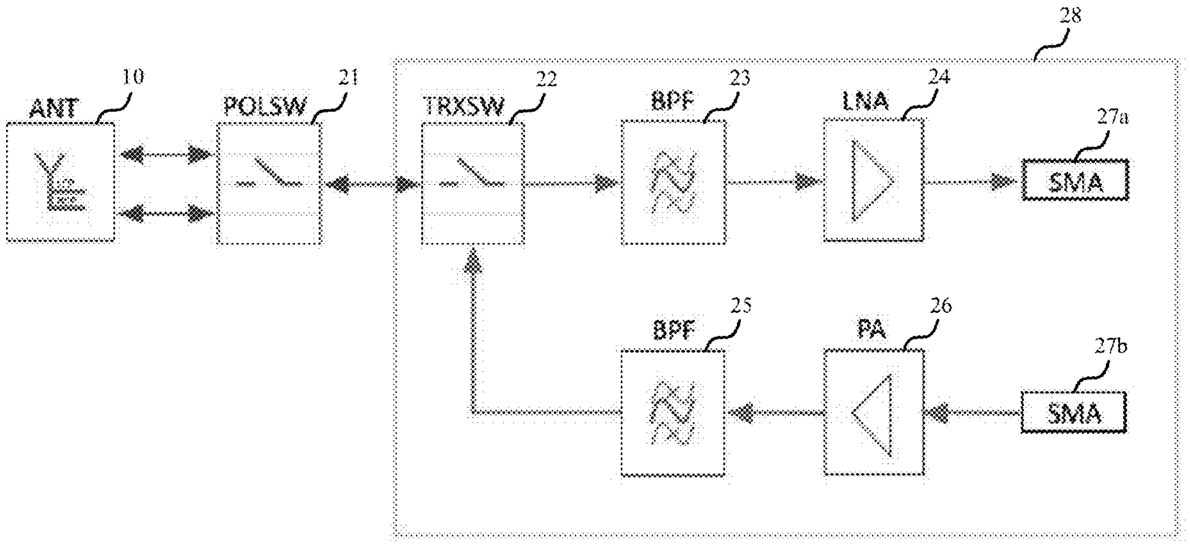
FIG. 2 illustrates a block diagram of the used electronics in an embodiment of the present invention.

FIG. 2 illustrates a block diagram of the used electronics, in an embodiment of the present invention.

The shown electric components (in FIG. 2) may be combined on the same PCB (i.e. printed circuit board) as the differential feeding network. In other words, such a PCB corresponds to the above discussed circuit board 17.

The PCB in this embodiment comprises a polarization switch 21, a TX/RX switch 22, a TX signal branch comprising a power amplifier 26 and a band-pass filter 25, an RX signal branch comprising a band-pass filter 23 and a low noise amplifier 24. The polarization switch 21 is abbreviated as "POLSW". The TX/RX switch 22 is abbreviated as "TRXSW". Band-pass filters 23 and 25 are marked as "BPF". The power amplifier 26 is marked as "PA" in the Figure, and the low noise amplifier 24 is marked as "LNA". Elements in the end (i.e. in the right-hand side of the Figure) marked as "SMA" mean standard SMA connectors 27*a*, 27*b* into which the respective TX and RX signals are connected to. However, any RF connector that operates at the used frequencies may be used, so the connector does not necessarily have to be an SMA connector in the present invention.

A self-calibration circuit or self-calibration loop 28 is discussed next with respect to the presented antenna structure, and in respect to FIG. 2.

The self-calibration circuit 28 comprises the antenna cablings, and circuit elements 22-26, wherein the self-calibration circuit 28 uses leakage in the TX/RX switch 22 as the main functional characteristic. In other words, the self-calibration circuit 28 starts from the SMA connector 27*b*, and proceeds via the PA 26, the BPF 25, and next to the TRXSW 22 (i.e. the TX/RX switch). After that the leakage signal proceeds into the RX branch, comprising the other BPF 23 and the LNA 24, and then ending up to the SMA connector 27*a*. Then the system comprises the antenna cablings in both the TX and RX sides, meaning the TX antenna cable going from a radio unit to the SMA connector 27*b*, and the RX antenna cable going from the SMA connector 27*a* to the same radio unit, in an embodiment.

The self-calibration circuit 28 is configured to be measured in order to obtain lengths of antenna cablings in both TX and RX signal branches, or in other words, the sum length of both the TX and RX antenna cables. Now the antenna cabling length information may be used in the actual terrestrial positioning determinations. For comparison, in prior art GPS antennas, there is no need to know the antenna cabling length for such an antenna. With the presented self-calibration loop 28 it is possible to measure phase lengths of the cables, PA, LNA and used filters without any extra electronics using leakage through the TX/RX switch 22 in the antenna unit.

Concerning the results obtained with the presented antenna structure, the following is concluded. Concerning angular range of −60 . . . 60 degrees, frequency range 5,2-5,9 GHz, and both RHCP and LHCP polarizations, the resulting phase center variation is approximately within 1.3 mm for the whole angular range for each of the measured four parameter sets. With this it is meant that the total phase center location variation across the whole angular range (applying any of the applied three frequencies) is approximately 1.3 mm at maximum. This is a very good result, and according to the requirement which was set earlier for the presented antenna structure. The antenna's electronics allow the RX and TX chains to be calibrated simultaneously so that the TX signal "leaks" through the TRX switch through the RX chain. Positioning antennas are RX antennas and may have associated active electronics. This active positioning antenna comprises both TX and RX electronics. In such embodiments, it does not require any phase performance from the antenna.

An advantage of the present invention is that the presented antenna is inexpensive to manufacture compared to professional RTK GNSS and other terrestrial positioning antennas. This is due to the small number of parts forming the antenna: e.g. just a single choke ring compared to several choke rings in many of the above prior art publications. Also, the single choke ring 13 also forms the housing 11 of the antenna. It is also essential that the top plane of the housing 11 that extends outwards from the choke ring's 13 outer edge, the choke ring 13 and the patch element 14 together form an entity, which prevents the radiation to propagate to a backward direction. It can be said that the presented antenna structure has simpler implementation compared to many prior art solutions. Especially, the radiator i.e. the patch element 14, is especially inexpensive to manufacture into the final product. Furthermore, the antenna structure is highly tailorable for the required terrestrial positioning purposes; in practice, by adjusting the dimensions and gaps between the main elements.

A further advantage is that relatively short length of the legs 15, which are possible with the invention, allow improved manufacturability. In one embodiment, the patch element 14 and the legs 15 can be manufactured from a single metal sheet just by bending.

A basic advantage is that the presented antenna design according to the present invention allows both TX and RX operation. The resulting two-directional measurement capability allows mm-accurate absolute distance measurement between only two antennas. On the contrary, in the prior art, accurate carrier-phase one-way measurement requires a high number of GNSS satellites in order to solve for the ambiguities and the distances.

A further advantage is that the mentioned requirements from the above are all fulfilled with a single antenna structural design, and also at the same time. The prior art solutions have not presented an antenna structure, which would fulfil all those requirements at the same time. Thus, this is an advantageous antenna design solution with great possibilities in its use scenarios for various different applications and situations concerning terrestrial positioning.

An advantage of the differentially connected input feeding signals is that if an aperture connected antenna structure and feeding signals were to be used, the feeding signal network would have been way more complicated (=it would be required to implement it in several layers i.e. a multi-layer PCB for the feeding signal network). Therefore, the advantage of the differential feeding network is the simpler structural design.

The advantage of the rotational symmetric radiator (i.e. the patch element 14 together with the supporting legs 15) and the differential input signal network and the respective wiring design is that the dual circular polarization in both the RCP and LCP are well enabled with good performance characteristics.

The advantage of using a metal sheet component as a patch element 14 is its inexpensiveness, but it still results in good radiation performance characteristics for the antenna 10. Also the required mechanical tolerances are quite modest, which contributes to the low-cost manufacturability.

The advantage of using just a single choke ring 13 in the design is that it allows pushing the patch element 14 closer to the ground plane 12 than in a typical patch antenna used in prior art. Furthermore, it allows smaller size and lighter weight within the whole structure.

A further advantage is that a single PCB with both TX and RX parts and with the differential feeding network on that single PCB, together with all active electronics, reduces costs. This relates to both the used material and to the manufacturing process.

Moreover, the arrangement of the circuit board 17 inside the housing 11, such that a single circuit board 17 comprises all electrical components required for signal propagation during TX/RX operation of the antenna 10, enables a compact light-weight structure of the antenna. Furthermore, the manufacturing cost of the antenna is substantially reduced by eliminating use of different types of costly fabrication materials employed by prior art solutions. Also, shaping the different components of the antenna from a same fabrication material (such as forming the patch element 14 and its four legs 15 by using same material and merely bending the material to form the four legs) without any major processing step, such as welding, etc., further reduces the production time of the antenna. Therefore, the design and intended working of the antenna is novel and non-obvious to a person skilled in the art.

As a conclusive summary, the prior art does not provide the above discussed technical effects, features, or the advantages listed above.

Furthermore an antenna 10 is provided. The antenna 10 comprises:

- a cylinder-shaped housing 11;
- a ground plane 12 within an upper half of the cylinder-shaped housing 11;
- a single choke ring 13 locating coaxially on the cylinder-shaped housing 11 on top of the ground plane 12, where the choke ring 13 and the housing 11 are integrally part of the same piece of material, where the diameter of the choke ring 13 is less than the diameter of the cylinder-shaped housing 11;
- a single round-shaped patch element 14, which patch element 14 is connected by four legs 15 onto a feeding network through the ground plane 12, the patch element 14 locating coaxially with the choke ring 13, within a cylindrical volume determined by the choke ring 13, obtaining an essentially rotationally symmetric structure;
- wherein a level difference of the patch element 14 in relation to the ground plane 12 is less than the height of the choke ring 13, wherein a top plane of the housing 11, the choke ring 13, the ground plane (12) and the patch element 14 together form an entity that define the radiation characteristics of the antenna, and wherein the antenna 10 is configured for both TX and RX operation. Furthermore the antenna is characterized in that the ground plane 12 forms a top surface of a circuit board 17 and a bottom surface of the circuit board 17 comprises the feeding network of differential input signals, fed via each of the four legs 15 onto the patch element 14, wherein the feeding network locates in an area determined to be inside the choke ring 13 but on an opposite surface of the circuit board 17, and wherein the circuit board 17 extends to an inner diameter of the housing 11.

In another embodiment, the antenna 10 comprises a cylinder-shaped housing 11; a ground plane 12 within an upper half of the cylinder-shaped housing 11; a single choke ring 13 locating coaxially on the cylinder-shaped housing 11 on top of the ground plane 12, where the choke ring 13 and the housing 11 are integrally part of the same piece of material, where the diameter of the choke ring 13 is less than the diameter of the cylinder-shaped housing 11; a single round-shaped patch element 14, which patch element 14 is connected by four legs 15 onto a feeding network through the ground plane 12, the patch element 14 locating coaxially with the choke ring 13, within a cylindrical volume determined by the choke ring 13, obtaining an essentially rotationally symmetric structure; wherein a level difference of the patch element 14 in relation to the ground plane 12 is less than the height of the choke ring 13, and the ground plane 12 forms a top surface of a circuit board 17 locating on top of the housing 11, and a bottom surface of the circuit board 17 comprises the feeding network of differential input signals, fed via each of the four legs 15 onto the patch element 14, wherein the feeding network locates in an area determined to be inside the choke ring 13 but on an opposite surface of the circuit board 17. Such embodiment provides surprisingly accurate millimeter level reliable radio positioning in all circumstances.

The present invention is not restricted merely to the embodiments presented above, but the present invention may vary within the scope of the appended claims.

The invention claimed is:

1. An antenna, wherein that the antenna comprises:

a cylinder-shaped housing;

a ground plane within an upper half of the cylinder-shaped housing;

a single choke ring locating coaxially on the cylinder-shaped housing on top of the ground plane, where the choke ring and the housing are integrally part of the same piece of material, where the diameter of the choke ring is less than the diameter of the cylinder-shaped housing;

a single round-shaped patch element, which patch element is connected by four legs onto a feeding network through the ground plane, the patch element locating coaxially with the choke ring, within a cylindrical volume determined by the choke ring, obtaining an essentially rotationally symmetric structure;

wherein a level difference of the patch element in relation to the ground plane is less than the height of the choke ring, and the ground plane forms a top surface of a circuit board locating on top of the housing, and a bottom surface of the circuit board comprises the feeding network of differential input signals, fed via each of the four legs onto the patch element, wherein the feeding network locates in an area determined to be inside the choke ring but on an opposite surface of the circuit board.

2. The antenna according to claim 1, wherein that the four legs that support the edges or near edges of the patch element with even mutual distances between one another are made of the same piece of material as the patch element.

3. The antenna according to claim 1, wherein that the bottom surface of the circuit board comprises electrical components outside of the area defined by the choke ring, but on the opposite surface of the circuit board.

4. The antenna according to claim 1, wherein that the housing comprises a plastic piece, which is placed below the circuit board, which plastic piece is pressable by force against the circuit board, with conductive gasket material placed between the top surface of the circuit board and the lower edge of the choke ring, enabling a galvanic contact between the ground plane and the choke ring.

5. The antenna according to claim 1, wherein that the patch element is manufactured from brass.

6. The antenna according to claim 1, wherein that the antenna is applicable in the frequency range of 5.2-5.9 GHz.

7. The antenna according to claim 1, wherein that the distance between the outer cylindrical edge of the housing and the single choke ring is approximately half of the used wavelength.

8. The antenna according to claim 1, wherein that the differential feeding network is configured to create two circular polarizations using the antenna, comprising a left circular polarization (LCP) and a right circular polarization (RCP).

9. The antenna according to claim 1, wherein that the antenna is configured to be applied in position determination measurements, performing RX measurements for signals incoming between −60 degrees-60 degrees in relation to the vertical direction right above the antenna.

10. The antenna according to claim 1, wherein that the bottom surface of the circuit board comprises a polarization switch, a TX/RX switch, a TX signal branch comprising a power amplifier and a band-pass filter, an RX signal branch comprising a band- pass filter and a low noise amplifier.

11. The antenna according to claim 10, wherein that a self-calibration circuit is configured to be measured in order to obtain lengths of antenna cablings in both TX and RX signal branches, the self-calibration circuit comprising the antenna cablings, and circuit elements, wherein the self-calibration circuit uses leakage in the TX/RX switch.

12. The antenna according to claim 1, wherein that the distance between the patch element and the ground plane is selected to be in a range of 0.1-0.15 times the wavelength.

13. The antenna according to claim 1, wherein that the distance between an outer edge of the patch element and the choke ring is selected from range of 0.14-0.18 times the wavelength, thus creating a substantially flat phase pattern and minimizing amplitudes of back lobes.

14. The antenna according to claim 1, wherein that the distance between an inner surface of the single choke ring and the closest leg is selected to be in a range of 0.1-0.15 times the wavelength.

15. The antenna according to claim 1, wherein that width of the legs is selected from a range of 1.0-3.0 mm.

16. The antenna according to claim 1, wherein that the cylindrical volume determined by the choke ring is covered from the top by a cover manufactured from high-density polyethylene, where the cover is almost RF transparent.

* * * * *